April 3, 1962

C. U. DEATON 3,028,037

MEANS FOR ATTACHING HOLLOW TUBULAR
ELEMENTS TO SOLID STRUCTURES

Filed April 4, 1960

INVENTOR.
CHARLES U. DEATON
BY
ATTORNEY

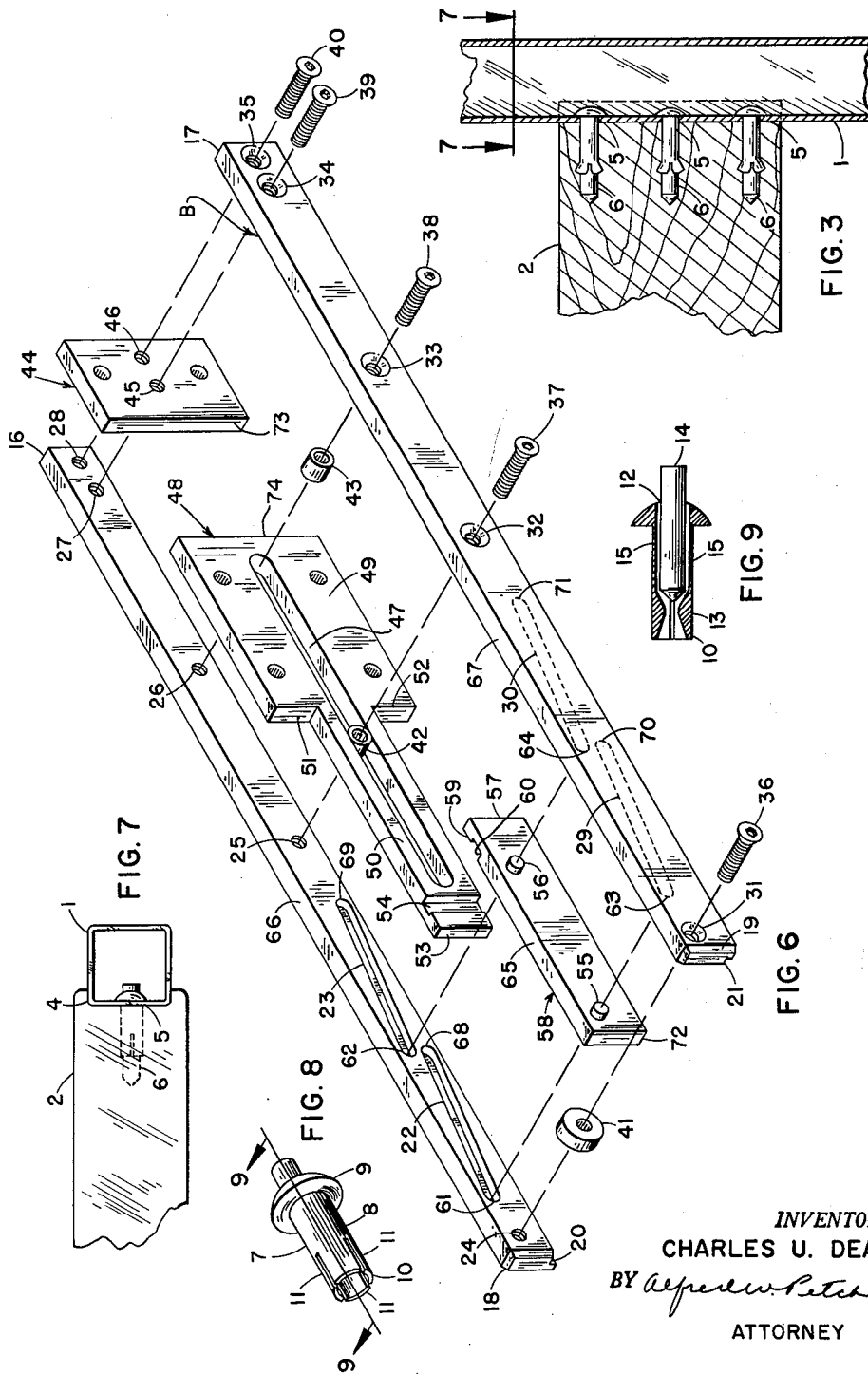

United States Patent Office 3,028,037
Patented Apr. 3, 1962

3,028,037
MEANS FOR ATTACHING HOLLOW TUBULAR
ELEMENTS TO SOLID STRUCTURES
Charles U. Deaton, 9635 W. Colfax Ave.,
Lakewood, Colo.
Filed Apr. 4, 1960, Ser. No. 19,863
7 Claims. (Cl. 218—30)

This invention relates in general to certain new and useful improvements in means for attaching tubular elements to similar laterally extending elements, such as, for example, tubular metal furniture legs to laterally extending wooden parts of the furniture.

Although the present invention has many applications in diverse fields, it may best be illustrated as applied in the furniture manufacturing field.

In the fabrication of contemporary furniture, for instance, it has become the current practice to use metal tubing for legs and other structural support members while using high-quality wood elsewhere for beauty. In attaching the metal members to the wooden members, it is a highly desirable feature to use attachment means which are not visible or exposed. Notwithstanding the need for concealment of such attachment means, it is equally necessary that the joint be strong, permanent and durable. Moreover, such joints must be economical in terms of material and labor cost.

It is, therefore, the primary object of the present invention to provide a means for attaching tubular elements to laterally extending structural elements in such manner that the fastening means is entirely concealed.

It is another object of the present invention to provide a securement means which may be inserted within a tubular element, such as a furniture leg, and which may be driven into a laterally extending structural element, such as a wooden furniture panel, thereby forming a strong, permanent, wholly concealed structural joint of connection between such elements.

It is a further object of the present invention to provide a tool for insertion in the hollow part of the support structure for cooperating with a rivet or attachment pin and for driving the rivet or attachment pin into gripforming engagement with the associated wooden part of the furniture.

It is an additional object of the present invention to provide a tool of the type stated for the use described above which is light, relatively easy to handle, and may be used as a common ordinary tool by furniture constructors.

It is still another object of the present invention to provide a tool of the type stated which is relatively efficient and is economical in cost.

With the above and other objects in view, my invention resides in the novel features of form, construction, arrangement and combination of parts presently described and pointed out in the claims.

In the accompanying drawings (2 Sheets)—

FIG. 3 is a fragmentary sectional view taken along line 3—3 of FIG. 2;

FIG. 6 is an exploded view of said pin driver;

FIG. 7 is a fragmentary sectional view taken along line 7—7 of FIG. 3;

FIG. 8 is a perspective view of the rivet means forming a part of the present invention; and FIG. 9 is a sectional view taken along line 9—9 of FIG. 8.

Figure 1:
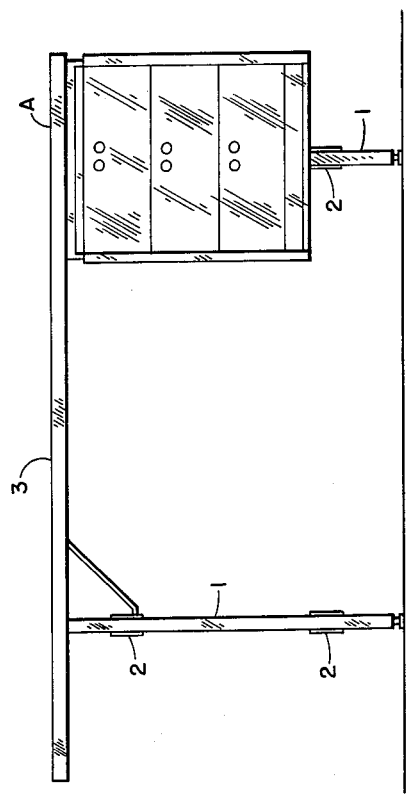
FIG. 1 is a front elevational view of a desk fabricated in accordance with and embodying the present invention.
Figure 4:
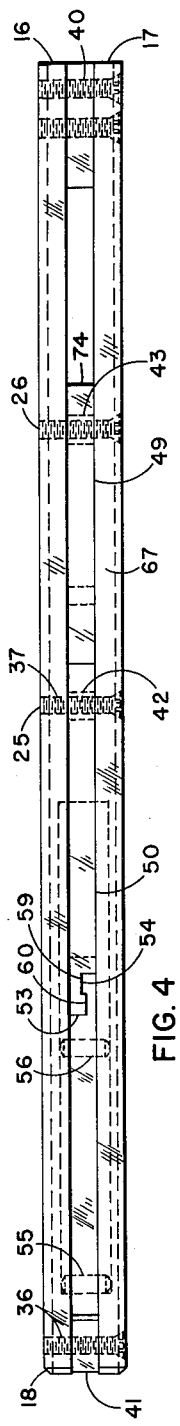
FIG. 4 is a top plan view of the pin driver forming a part of the present invention.
Figure 5:
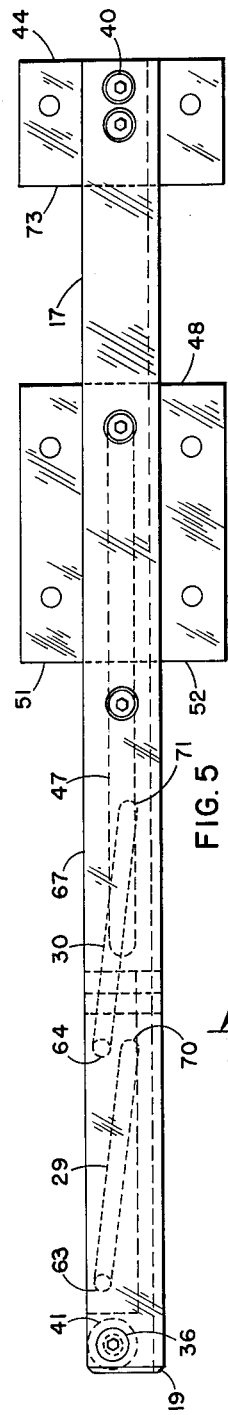
FIG. 5 is a side elevational view of said pin driver.
Figure 2:
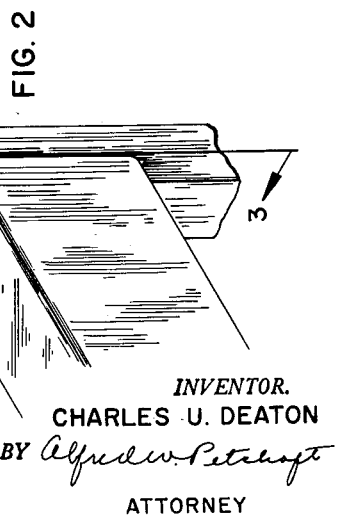
FIG. 2 is a partial perspective view showing the metallic support members and a wooden cross-piece after having been fastened together by means of the present invention.

Referring now in more detail and by reference characters to the drawings, which illustrate a preferred embodiment of the present invention, A designates a desk comprising a plurality of legs 1 supported intermediate their ends by wooden cross-pieces 2, which are attached at their upper ends to the main body 3 of the desk A. The metal leg element 1 is hollow in cross-section throughout its entire length and the wooden element 2 is provided with an elongated groove 4 sized for flush-fitting overlapping engagement with the metal leg element 1 as depicted in FIG. 7 to provide lateral rigidity for the juncture of the leg 1 and the wooden cross-piece 2. The metal leg element 1 is provided with a plurality of apertures 5, which are in substantial alignment with a plurality of bores 6 in the wooden cross-piece 2 when the leg 1 and the cross-piece 2 are in proper engagement. Inserted within the aperture 5 and the bore 6, when the leg 1 and the cross-piece 2 are in alignment, is an attachment pin 7 comprising a tubular shell 8 provided at one end with a head 9. The end 10 of the shell 8 opposite the head 9 is provided with four peripheral slots 11 which extend transversely along the shell 8 for purposes presently more fully appearing. The shell 8 is also internally provided with an axial bore 12 of substantially cylindrical shape and provided near the end 10 with a plurality of inwardly extending integral cam-bosses 13, which form a diametrally reduced internal restriction in the bore 12.

Inserted within the bore 12, and extending outwardly past the head 9 is an elongated pin 14 of substantially cylindrical shape and is in free sliding engagement with the inwardly presented surface of the bore 12. It should be noted that the diametral size of the pin 14 is substantially larger than the inwardly presented diametral restriction formed by the cam-bosses 13, so that as the pin 14 is shifted axially within the shell 8, the pin 14 will engage the cam-bosses 13 and cause the shell 8 to bend outwardly between the spaced slots 11.

B designates a driving and setting tool comprising a pair of elongated substantially rectangular bars 16, 17, each provided with a tapered end 18, 19, and a lower shoulder 20, 21, which extends the entire length of the bars 16, 17, for purposes presently more fully appearing. The bar 16 is also provided with a pair of spaced slotted grooves 22, 23, which are oblique to the longitudinal axis of the bar 16, and also includes five spaced threaded holes 24, 25, 26, 27, and 28. In like manner, the bar 17 is also provided with a pair of oblique grooves 29, 30, which are complementary to and of the same size as the grooves 22, 23, in the bar 16. The bar 17 is also provided with countersunk apertures 31, 32, 33, 34, 35, which are complementary to the threaded holes 24, 25, 26, 27, 28, in the bar 16 and which are sized for insertion of bolts 36, 37, 38, 39, 40, whereby the two bars 16, 17, may be held in spaced parallel relationship one to the other. To hold the bars 16, 17, securely in spaced relationship one to the other a spacer ring 41 is placed about the bolt 36 between the bars 16, 17; sleeves 42, 43, are respectively placed about the bolts 37, 38, between the bars 16, 17, and a striking plate 44 provided with apertures 45, 46, into which the bolts 39, 40, are inserted, is also located between the bars 16, 17. It should be noted that the spacer ring 41, the sleeves 42, 43, and the striking plate 44 are all substantially of the same depth whereby when the bolts 36, 37, 38, 39, 40, are securely fitted between the spacer ring 41, the sleeves 42, 43, and the striking plate 44 into the bar 16, the bars 16, 17, are held securely in parallel relationship one to the other with the grooves 22, 23, being in aligned relationship with the slots 29, 30. It should be noted that the bars 16, 17, when thus assembled are sized for insertion within the hollow portion of the leg element 1.

The sleeves 42, 43, are also inserted in an elongated slide-forming aperture 47 of a positioning plate 48 comprising a substantially rectangular main body portion 49 and a narrow elongated portion 50, the narrow portion 50 and the rectangular portion 49 being separated one from the other by a pair of shoulders 51, 52. The narrow portion 50 is provided at the end furthest from the main body 49 with a transverse tongue 53 and groove 54 combination as depicted in FIG. 6. It should be noted that the positioning plate 48 is sized slightly smaller in depth than spacer ring 41, the sleeves 42, 43, or the striking plate 44 so as to be freely slidable between the bars 16, 17.

Slidably mounted in the grooves 22, 23, 29, and 30, are pins 55, 56, which extend transversely outwardly from either side of the main body 57 of a hammer 58 which is also slightly less in depth than the spacer ring 41 so as to be freely movable between the bars 16, 17. The hammer 58 is also provided with a tongue 59 and a groove 60 for interlocking relationship with the tongue 53 and the groove 54 in the positioning plate 48 for purposes presently more fully appearing. The hammer 58 is substantially smaller in width than the bars 16, 17, and the pins 55, 56, are located thereon in such manner that when the pins 55, 56, are at one end 61, 62, 63, 64, of the grooves 22, 23, 29, 30, the upper surface 65 of the hammer 58 is flush with the upper surfaces 66, 67, of the bars 16, 17, and when the pins 55, 56, are at the opposite ends 68, 69, 70, 71, of the grooves 22, 23, 29, 30, the bottom surface 72 of the hammer 58 is flush with the shoulders 20, 21, of the bars 16, 17. The striking plate 44 has substantial width and is provided with an inwardly presented flat surface 73 which abuts a complementary flat surface 74 on the positioning plate 48 when the pins 55, 56, are at the ends 68, 69, 70, 71, of the grooves 22, 23, 29, 30, whereby to limit the travel of said pins in said grooves.

In use, the desk A has its legs 1 and cross members 2 assembled as follows. The attachment pins 7 are set into the apertures 5 of the leg 1 either manually or by use of a suitable tool, not forming a part of the present invention which holds the attachment pins 7 as it is moved downwardly through the hollow portion of the leg element 1 and is inserted in the aperture 5 therein. It should be noted that the diametral size of the main body 8 and the diametral size of the aperture 5 are sized for snug-fitting engagement one within the other such that after the attachment pin is set into the aperture 5, it will retain itself in place. After attachment pins 7 are set into all the apertures 5, the leg 1 is laid into the groove 4 of the crosspiece 2, and the attachment pins 7 are then thereby brought into alignment with the bores 6 in the cross-piece 2 in the manner depicted in FIG. 7, with the pins 14 extending slightly outwardly from the head 9. The tool B is inserted in the hollow portion of the leg element 1 in such manner that the shoulders 20, 21, provide clearance for the head 9 of the attachment pins 7 and with the hammer 58 in substantial alignment with the upper surfaces 66, 67, of the bars 16, 17, whereby to provide clearance for the pin 14. The longitudinal length of the narrow portion 50 of the positioning plate 48 is sized so that when the shoulders 51, 52, are brought into abutment with the lower margins of the leg 1, the hammer 58 is in simultaneous alignment with all of the pins 14 extending outwardly from the attachment pins 7 for one particular wooden cross member 2, the hammer 58 also being properly sized to achieve this purpose. After the insertion of the tool B, a blow applied to the striking plate 44 with a conventional hammer will cause the bars 16, 17, to move inwardly through the hollow portion of the leg member 1. This inward movement will cause the hammer 58 which is secured by the tongue and groove combinations 53, 54, 59, 60, to the positioning plate 48 to move transversely with respect thereto due to the transverse force presented on the hammer 58 by the pins 55, 56, as they move through the grooves 22, 23, 29, 30, whereupon the bottom surface 72 of the hammer 58 is brought into contact with the upwardly extending pins 14 of the attachment pins 7 causing the pins 14 to move through said attachment pins. As the pins 14 move inwardly, they contact the necks 13, causing the ends 10 separated by the slots 11 to flare outwardly into the wood, as depicted by FIG. 3, into grip-forming engagement therewith, whereby the leg element 1 and the crosspiece 2 are securely joined together. Thereupon, the tool B may be removed from the leg element 1 and the attachment pins 7 will securely unite the leg 1 and the cross member 2.

It should be understood that changes and modifications in the form, construction, arrangement and combination of the several parts of the tool and attachment pin construction may be made and substituted for those herein shown and described without departing from the nature and principle of my invention.

Having thus described my invention, what I claim and desire to secure by Letters Patent is:

1. A pin driver for use in applying transversely directed forces in hollow elements, said pin driver comprising a plate provided with means for locating said plate with respect to said hollow element, a hammer operatively connected to said plate and being transversely slidable relative thereto, a bar slidably mounted on said plate and being sized for movement within said hollow element, and cooperating means operatively mounted on said bar and said hammer for urging said hammer transversely as said bar moves with respect to said plate.

2. A pin driver for use in applying transversely directed forces in hollow elements, said pin driver comprising a plate provided with means for locating said plate with respect to said hollow element, a hammer operatively connected to said plate and being transversely slidable relative thereto, a pair of bars slidably mounted on opposite sides of said plate and being sized for movement within said hollow element, said bars being fastened securely one to the other, elongated grooves formed in each of said bars, and means operatively mounted on said hammer cooperating with the elongated grooves of said bars for urging said hammer transversely as said bars move with respect to said plate.

3. A pin driver for use in applying transversely directed forces in hollow elements, said pin driver comprising a plate provided with means for locating said plate with respect to said hollow element, a hammer operatively connected to said plate and being transversely slidable relative thereto, and a pair of bars slidably mounted on opposite sides of said plate and being sized for movement within said hollow element, said bars being fastened securely one to the other and being provided with elongated grooves which are obliquely inclined to the longitudinal axis of said bars, said hammer being provided with pin means extending outwardly on opposite sides thereof for sliding engagement with said grooves, whereby as said bars move with respect to said plate said pins slide in said grooves causing transverse motion of said hammer.

4. A pin driver for use in applying transversely directed forces in hollow elements, said pin driver comprising a plate provided with means for locating said plate with respect to said hollow element, a hammer operatively connected to said plate and being transversely slidable relative thereto, a pair of bars slidably mounted on opposite sides of said plate and being sized for movement within said hollow element, said bars being fastened securely one to the other and being provided with elongated grooves which are obliquely inclined to the longitudinal axis of said bars, said hammer being provided with pin means extending outwardly on opposite sides thereof for sliding engagement with said grooves, whereby as said bars move with respect to said plate said pins slide in said grooves causing transverse motion of said hammer, and a striking plate securely mounted between said bars and being provided with a first surface for applying a moving force to said bars and a second surface for cooperating with said plate to limit the movement of said bars with respect thereto.

5. A pin driver for use in applying transversely directed forces in hollow elements, said pin driver comprising a plate provided with a substantial body portion and a narrow outwardly extending portion and including a pair of shoulders at the juncture of said body and narrow portions, said narrow portion being sized for insertion in said hollow element, said shoulders being sized to abut the ends of said hollow element whereby to locate said plate with respect to said hollow element, a hammer operatively connected to said plate and being transversely slidable relative thereto, a pair of bars slidably mounted on opposite sides of said plate and being sized for movement within said hollow element, said bars being fastened securely one to the other, elongated grooves formed in each of said bars, and means operatively mounted on said hammer cooperating with the elongated grooves of said bars for urging said hammer transversely as said bars move with respect to said plate.

6. A pin driver for use in applying transversely directed forces in hollow elements, said pin driver comprising a plate provided with a substantial body portion and a narrow outwardly extending portion and including a pair of shoulders at the juncture of said body and narrow portions, said narrow portion being sized for insertion in said hollow element, said plate also including an elongated aperture, a hammer operatively connected to said plate and being transversely slidable relative thereto, a pair of bars sized for movement within said hollow element and being connected in spaced relationship at their respective ends and also through said elongated aperture, whereby to be slidably movable with respect to said plate, elongated grooves formed in each of said bars, and means operatively mounted on said hammer cooperating with the elongated grooves of said bars for urging said hammer transversely as said bars move with respect to said plate.

7. A pin driver for use in applying transversely directed forces in hollow elements, said pin driver comprising a plate provided with a substantial body portion and a narrow outwardly extending portion and including a pair of shoulders at the juncture of said body and narrow portions, said narrow portion being sized for insertion in said hollow element, said shoulders being sized to abut the ends of said hollow element whereby to located said plate with respect to said hollow element, said plate also including an elongated aperture and a first transversely directed tongue and groove combination at the end of said narrow portion, a hammer provided with a second complementary tongue and groove combination for overlapping combination with said first tongue and groove combination in said plate whereby to become transversely movable with respect thereto, a pair of bars sized for movement within said hollow element and being connected in spaced relationship at their respective ends and also through said elongated aperture, whereby to be slidably movable with respect to said plate, elongated grooves formed in each of said bars, and means operatively mounted on hammer cooperating with the elongated grooves of said bars for urging said hammer transversely as said bars move with respect to said plate.

References Cited in the file of this patent

UNITED STATES PATENTS

| | | |
|---|---|---|
| 923,036 | Ebbels | May 25, 1909 |
| 1,361,340 | Ledwinka | Dec. 7, 1920 |
| 2,216,784 | Payne | Oct. 8, 1940 |
| 2,934,234 | Bisbing | Apr. 26, 1960 |